United States Patent [19]
Goodacre et al.

[11] Patent Number: 5,946,640
[45] Date of Patent: Aug. 31, 1999

[54] COMPOSITION ANALYSIS

[75] Inventors: Royston Goodacre; Douglas Bruce Kell, both of Aberystwyth, United Kingdom

[73] Assignee: University of Wales Aberystwyth, Dyfed, United Kingdom

[21] Appl. No.: 08/973,595

[22] PCT Filed: Jun. 10, 1996

[86] PCT No.: PCT/GB96/01390

§ 371 Date: Dec. 8, 1997

§ 102(e) Date: Dec. 8, 1997

[87] PCT Pub. No.: WO96/42058

PCT Pub. Date: Dec. 27, 1996

[30] Foreign Application Priority Data

Jun. 8, 1995 [GB] United Kingdom .................. 9511619
Apr. 9, 1996 [GB] United Kingdom .................. 9607339

[51] Int. Cl.$^6$ ............................ G06F 15/42; G01N 27/26
[52] U.S. Cl. ................................ 702/87; 702/22; 701/59; 706/15; 364/48.03; 364/528.01
[58] Field of Search .................................. 702/87, 28, 27, 702/22; 364/578, 400, 148.03, 528.01; 701/59; 706/15

[56] References Cited

U.S. PATENT DOCUMENTS

| | | | |
|---|---|---|---|
| 5,218,529 | 6/1993 | Meyer et al. | 702/28 |
| 5,267,151 | 11/1993 | Ham et al. | 364/413.09 |
| 5,349,541 | 9/1994 | Alexandro, Jr. et al. | 364/578 |
| 5,446,681 | 8/1995 | Gethner et al. | 702/27 |
| 5,545,895 | 8/1996 | Wright et al. | 702/23 |
| 5,554,273 | 9/1996 | Demmin et al. | 205/785 |

FOREIGN PATENT DOCUMENTS

WO94/09362  4/1994  WIPO .

OTHER PUBLICATIONS

Ali Ipakchi et al., "Neural Network Applications to Measurement Calibration Verification in Power Plants"; Apr. 29. 1996; vol. 53–11,pp. 959–963.

P. Olmos et al.; "Drift Problems in an Automatic Analysis of Gamma–Ray Spectra Using Associative Memory Algorithms"; IEEE transactions on Nuclear Science, vol. 41, No. 3, Jun. 1994.

Fabrio A.M. Davide et al; "Self–organizing multi–sensor systems for odour classification;internal categorization, adaptation and drift rejection"; 1994; in Sensors and Actuators B, 18–19,pp. 244–258.

Hanns–Erik Endres et al.; "Improvement in signal evaluation methods for semiconductor gas sensors"; in Sensors and Actuators B 26–27,pp. 267–270; 1995.

Mary Lou Padgett et al.; "Neural Network Robustness"; Proceedings of the 1991 Summer Computer Simulation Conference; Jul. 22–24, 1991,pp. 330–334.

*Primary Examiner*—John Barlow
*Assistant Examiner*—Hien Vo
*Attorney, Agent, or Firm*—David P. Gordon; David S. Jacobson; Thomas A. Gallagher

[57] ABSTRACT

A method and apparatus for analysing a sample, in which a neural network is trained to correct for measurement drift of a given analytical instrument (e.g., a mass spectrometer). The training is carried out using first and second sets of data obtained by the instrument from samples of known compositions at initial and subsequent instants of time, respectively. The trained neural network is used to transform data, obtained by the instrument from a sample of unknown composition at said subsequent instant of time, to an estimate of the data which would have been obtained by the instrument from that sample at the initial instant of time. The transformed dasta is then analysed to analyse the sample of unknown composition.

20 Claims, 8 Drawing Sheets

A

B

--- Py-mass spectra collected on 27 August, 1992 (*Time 1*)
--- Py-mass spectra collected on 19 April, 1994 (*Time 2*)
--- Neural network transformation of PyMS data collected on 19 April, 1994

→·→ Py-mass spectra collected on 22 July, 1993 (*Time 1*)
→■→ Py-mass spectra collected on 19 April, 1994 (*Time 2*)
→▲→ Neural network transformation of PyMS data collected on 19 April, 1994

COMPOSITION ANALYSIS

BACKGROUND OF THE INVENTION

1. Field of the Invention

This invention relates to a method of and apparatus for analysing the composition of substances and, more particularly, to a method and apparatus which correct for measurement drift, which occurs over time, in analytical apparatus or instruments, such as mass spectrometers.

2. State of the Art

There is a continuing need for rapid and precise analyses of the chemical or biochemical composition of biological and microbiological systems, both within biotechnology and for the purposes of identifying potentially pathogenic organisms. Pyrolysis mass spectrometry is an instrument-based technique which is currently used to perform such analyses. Pyrolysis is the thermal degradation of complex material in an inert atmosphere or a vacuum, which causes molecules to cleave at their weakest points to produce smaller, volatile fragments. For example, one version of this technique is known as Curie-point pyrolysis which involves drying a sample of the complex material to be analysed onto a metal and then heating the metal to its Curie point over a short space of time (typically 0.5 seconds). The degradation products are then separated and counted by a mass spectrometer in order to produce a pyrolysis mass spectrum which can be used as a 'chemical profile' or fingerprint of the complex material undergoing analysis. Pyrolysis mass spectrometry involves minimum sample preparation and enables materials to be analysed directly, i.e. without using a reagent. It is also rapid, quantitative, relatively cost efficient and can be conveniently automated. Pyrolysis mass spectrometry is a well established method within biology and microbiology for the differentiation and identification of groups of bacteria, fungi and yeasts, and has also been applied to the authentication of foodstuffs, because it is a highly discriminatory method of analysis which may be used on any organic material.

In recent years, pyrolysis mass spectrometry techniques have been expanded in order to perform quantitative analysis of the chemical constituents of microbial and other samples, by means of supervised learning methods using artificial neural networks. Multivariate linear regression techniques such as partial least squares (PLS) regression and principal components regression (PCR) have been found to provide an effective method of following the production of indole in a number of strains of *E. coli* grown on media incorporating amounts of tryptophan, quantifying the chemical or biochemical constituents of complex biochemical binary mixtures of proteins and nucleic acids in glycogen, and measuring the concentrations of tertiary mixtures of cells of the bacteria *Bacillus subtilis, Escherichia coli* and *Staphylococcus aureus*. Such techniques, also known as chemometric techniques, have also been used for biotechnological purposes in order to perform quantitative analysis of recombinant cytochrome $b_5$ expression in *E. coli*, and in order to effect rapid screening of high-level production of desired substances in fermentor broths. Pyrolysis mass spectrometry techniques combined with artificial neural networks have also been exploited for rapid and accurate assessment of the presence of lower-grade seed oils as adulterants in extra virgin olive oils, and for effecting rapid identification of strains of Eubacterium, Mycobacterium, Propionibacterium spp., and Streptomyces. The use of supervised learning techniques to identify and analyse samples from their pyrolysis mass spectra is advantageous because it eliminates the necessity for interpretation of complex principal components analyses and cononical variates analyses plots employed in the past: the identities of the components in a sample are binary-encoded at the output layer of the neural network such that the results may be easily read.

However, pyrolysis mass spectrometry techniques using neural network analysis are generally limited to short-term identification of components wherein all microorganisms are analysed in a single batch. This is due to the uncertainty of long-term reproduction of the pyrolysis mass spectrometry system. It has been found that sets of data obtained at the beginning and end of a relatively long time period, for example 14 months, cannot be directly compared due to long-term ion source ageing, i.e. over long periods of extended use, intractible organic debris collects around the ion source, which alters the transmissivity of ions and thus causes mass spectral drift.

In order to compensate or correct for mass spectral drift, it is necessary to tune the mass spectrometry instrument. Such tuning is typically achieved using the volatile standard perfluorokerosene and is known in the art. However, this procedure does not compensate for all of the instrumental drift.

SUMMARY OF THE INVENTION

We have now devised a method and apparatus which overcome the problems outlined above.

In accordance with the present invention, there is provided a method of analysing a sample, comprising the steps of training a neural network to correct for measurement drift of a given analytical instrument, said training being carried out using a first set of data obtained by said instrument from samples of known compositions at an initial instant of time and a second set of data obtained by said instrument from samples of the same known compositions at a subsequent instant of time, then using said neural network to transform data, obtained by said instrument from a sample of unknown composition at said subsequent instant of time, to an estimate of the data which would have been obtained by said instrument from said sample of unknown composition at said initial instant of time, and analysing the transformed data to analyse said sample of unknown composition.

Also in accordance with the present invention, there is provided an apparatus for analysing a sample, comprising a neural network arranged to be trained to correct for measurement drift of a given analytical instrument, using first and second sets of data obtained by said instrument from samples of known compositions at initial and subsequent time instants respectively, said neural network further being arranged to transform data, obtained by said instrument from a sample of unknown composition at said subsequent instant of time, to an estimate of the data which would have been obtained by said instrument from said sample of unknown composition at said initial instant of time, and means for analysing the transformed data to analyse said sample of unknown composition.

To correct for drift it is necessary to analyse the same standards at two different times and use some sort of mathematical correction method. One might simply subtract the amount of drift from new spectra collected, however this would assume that the drift is uniform (linear) with time, which is not the case: the technique would also rely on the variables (masses) being void of noise, which is also not the case with (pyrolysis) mass spectral data. Artificial neural networks carry out non-linear mappings, whilst still being able to map the linearities, and are robust to noisy data. Thus, in accordance with the present invention, the mass spectra of a material may be transformed to look like the mass spectra of the same material as formed at a previous instant of time, in a manner which is robust to noisy data and able to perform linear mappings. A fully interconnected neural network may be used to correct for mass spectral drift by transforming data collected the later instant of time, into an estimate of the mass spectra at the previous instant and comparing the results with correction techniques which exploit linear transformations either by subtracting the drift or by using a mass-by-mass linear scalar based on the ratio of the old-to-new mass values.

We have found that the neural network, for such data transformation, can be trained using relatively few samples as compared with the number of samples needed to train the neural network to directly analyse a sample of unknown composition.

Preferably the first and second sets of data consist of the mass spectra data of the substance to be analysed. The mass spectra may be obtained by any known mass spectrometry technique, for example, pyrolysis mass spectrometry. Preferably, the apparatus or instrument used to obtain the mass spectra or other sets of data is initially tuned.

Preferably the neural network is an artificial neural network which comprises an input layer and an output layer. It may optionally also comprises a third, hidden layer.

Embodiments of the present invention will now be described by way of examples only and with reference to the accompanying drawings:

DETAILED DESCRIPTION OF THE PREFERRED EMBODIMENT

Figure 1:
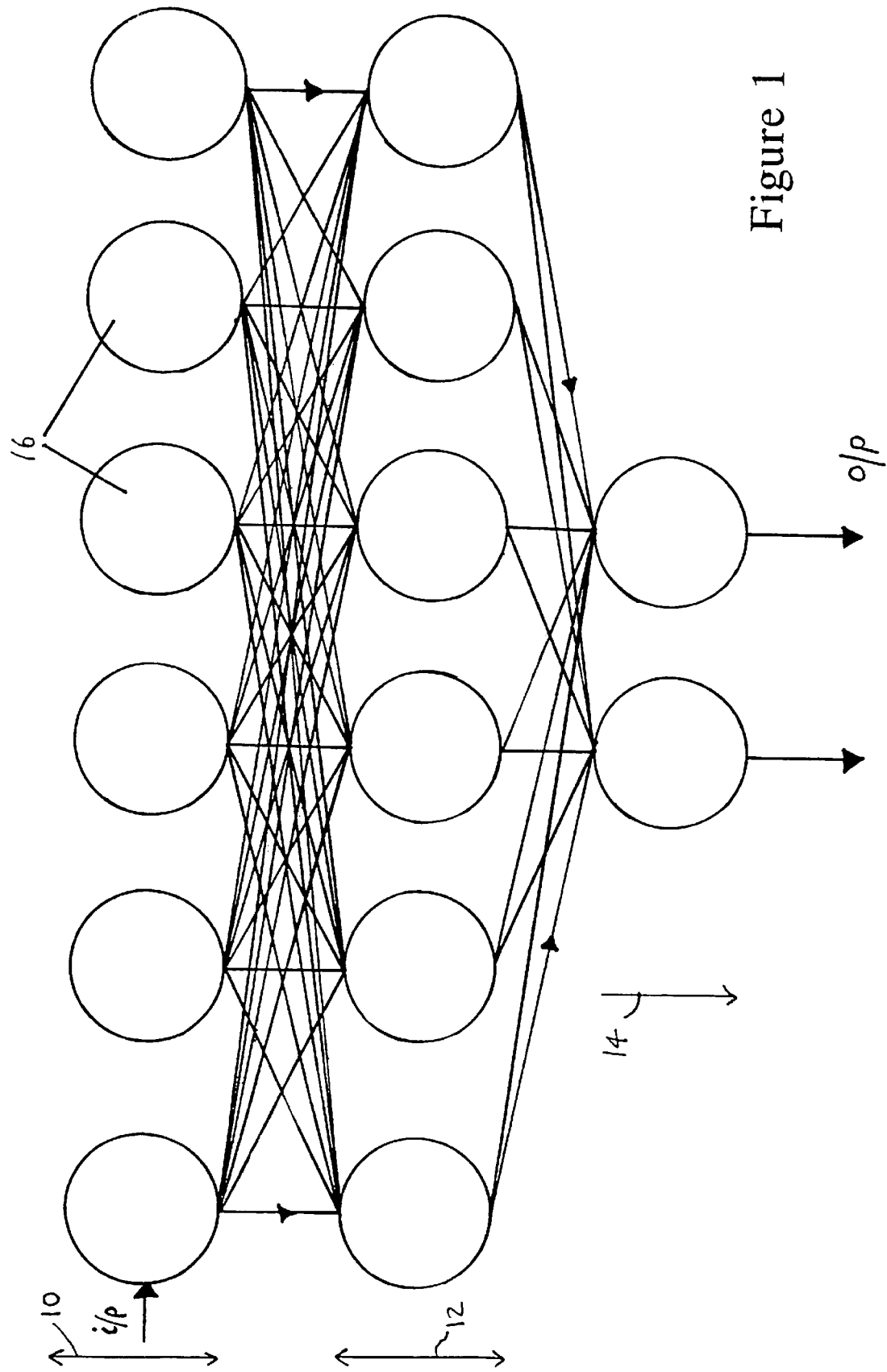
FIG. 1 is a schematic diagram of the structure of a typical neural network.

In the example shown in the drawings, four sets of data are analysed at two different times. The data consists of:

(1) the quantification of lysozyme in glycogen;

(2) the quantification of *Staphylococcus aureus* in mixtures with Escherichia coli;

(3) the quantification of the antibiotic ampicillin in a mixture with *Escherichia coli* to mimic a fermentor; and (4) the identification of human isolates of *Propionibacterium acnes*.

The samples of each composition may be prepared as follows:

(1) For quantification of lysozyme in glycogen, the mixtures are generally mixtures prepared such that 5 $\mu$l of a solution contains 0–100 $\mu$g (in steps of 5 $\mu$g) of lysozyme (from chicken egg white, Sigma), in 20$\mu$g glycogen (oyster type II, Sigma).

(2) For quantification of ampicillin in *Escheria coli*, ampicillin (desiccated D[-]-a-aminobenzylpenicllin sodium salt, $\geq$98% (titration), Sigma) may be prepared in bacterial slurries of 40 mg.ml$^{-1}$ *E. coli* W3110 to give a concentration range of from 0 to 5000 $\mu$g.ml$^{-1}$ in 250 $\mu$g.ml$^{-1}$ steps.

(3) For quantification of *Staphylococcus aureus* in *Escherichia coli*, the bacteria used may be *E. coli* W3110 and *S. aureus* NCTC6571. Both strains can be grown in 21 liquid media (glucose (BDH), 10.0 g; peptone (LabM), 5.0 g; beef extract (LabM), 3.0 g; H$_2$O, 11) for 16 h at 37° C. in a shaker. After growth the cultures are harvested by centrifugation and washed in phosphate buttered saline (PBS). The dry weight of the cells is typically estimated gravimetrically and used to adjust the weight of the final slurries using PBS to approximately 40 mg.ml$^{-1}$. Mixtures may then be prepared consisting of x % *E. coli* and y % *S. aureus*, where x:y were 100:0, 90:80, 80:20, 75:25, 70:30, 60:40, 50:50, 40:60, 30:70, 25:75, 20:80, 10:90, and 0:100.

(4) For identification of *Propionibacterium acnes, P. acnes* isolates are recovered from the foreheads of, for example, three normal adults. In this example, nine isolates are taken from person a, five from person b and five from person c. The *P. acnes* isolates are incubated anaerobically for 7 days at 37° C. on a single batch of coryneform agar (CA) agar (composition g 1$^{-1}$; tryptone soya broth (Oxoid) 30, yeast extract (Oxoid) 10, agar No. 1 (Oxoid) 10, and Tween 80 (Sigma) 10 ml 1$^{-1}$). After growth biomass is carefully collected in phosphate buffered saline and frozen at −20° C.

A quantity, for example 5 $\mu$l, of the samples prepared as described above are evenly applied onto iron-nickel foils. Prior to pyrolysis, the samples may be oven dried at 50° C. for 30 min and the mass spectrometer is calibrated using the chemical standard perfluorokerosene (Aldrich), such that m/z 181 was one tenth of m/z 69. A standard pyrolysis mass spectrometer may be used, for example, the Horizon Instruments PYMS-200X (Horizon Instruments Ltd., Ghyll Industrial Estate, Heathfield, E. Sussex). The sample tube carrying the foil is heated, prior to pyrolysis, at 100° C. for 5 sec. Curie-point pyrolysis is at 530° C. for 3 sec, with a temperature rise time of 0.5 sec. The pyrolysis mass spectra collected are normalised so that the total ion count is, for example, $2^{16}$ to remove the influence of sample size per se.

The sets of data in each category are analysed at time periods separated by between 4 and 20 months, as shown in Table 1 below, and this data can be displayed as quantitive pyrolysis mass spectra, in which the abcissa represents the m/z ratio whilst the ordinate contains information on the ion count for any particular m/z value ranging from, for example, 51–200. Initially, in order to observe the "natural" relationships between samples, the normalised data is analysed by, for example, principal components analysis (PCA) which is a well known technique for reducing the dimensionality of multivariate data whilst preserving most of the variance and, whilst it does not take account of any groupings in the data, neither does it require that the populations be normally distributed, i.e. it is a non-parametric method.

The pyrolysis mass spectra data obtained are analysed by means of an artificial neural network. Referring to FIG. 1 of the drawings, a typical three-layered neural network comprises an input layer 10, a 'hidden layer' 12 and an output layer 14. Each layer comprises a plurality of processing elements known as neurons 16, and each neuron 16 in a layer is connected to each neuron in its adjacent layer. Each of the connections between the neurons 16 is weighted and initially each weight is set to a random value.

During the training stage, an input from each set of data is paired with a desired output, and together these values are known as a training pair or training pattern. The neurons 16 sum the respective input signals fed to them and output this sum to a connection where it is scaled by the weight of that connection. The weight function in this example is a sigmoidal function, typically $f=1/(1+e^{-N})$, where x is the sum of the inputs. The neural network is trained over a number of training pairs, collectively known as a training set. As each input is applied to the network, the system is permitted to run until an associated output is obtained. The difference between this output and the desired output is fed back to the system input and the system is then permitted to run again. During each run, the weights are modified according to the difference in each case between the actual and desired outputs. This procedure, which is known as back-propagation, is repeated until a sufficiently low error margin is achieved. 'Learning rate' relates to the magnitude of the difference in the error margin after each run, and 'momentum' is a term used to describe a correction process which the neural network performs on the error margin in order to smooth it out. This function is made possible because the network remembers the previous weight change made. Thus, for example, a learning rate of 0.1 and a momentum of 0.9 are considered to be suitable error margin values. Typical training data for Lysozyme, Ampicillin and S. aureus and the neural network solution for each, resulting from the training stage, is shown in Table 2 below. Training data for P. acnes may be obtained by replicating the normalised pyrolysis mass spectra of two isolates from each of the people and binary encoding the outputs such that, for example, P. acnes from person a is coded as 1 0 0, from person b as 0 1 0, and from person c as 0 0 1. The input layer is scaled across the whole mass range from 0 to 3500 and the output layer is scaled between 0 and 1. Training is preferably stopped when the percentage RMS error in the training set is 1% which takes approximately $2.10^3$ epochs.

A suitable neural network structure for the purposes of the present invention comprises a fully interconnected feed-forward network and consists of an input layer comprising 150 nodes (normalised pyrolysis mass spectra) connected to the output layer containing x nodes (where x is the number of determinands) via a single "hidden" layer containing 8 nodes; for some analyses, however, the hidden layer need not be used. This topology may be represented as a 150-8-x architecture. In addition, the hidden layer (if present) and output layer are connected to the bias (the activation of which is always +1), whose weights will also be altered during training. Before training commences, the values applied to the input and output nodes are normalised between 0 and +1, and the connection weights are set to small random values. These methods and considerations are known to those skilled in the use of artificial neural networks.

A number of drift correction methods, for example, four, may be employed in order to transform pyrolysis mass spectra collected at the later date (Time 2) into those collected initially (at Time 1), thereby allowing new mass spectra to be directly compared with old mass spectra and enabling the neural network, previously trained using data collected at Time 1, to quantify or identify the various substances mentioned above.

Calibration spectra are chosen at the two time periods, for example, (1) for the quantification of lysozyme in glycogen, these may be the replicate normalised pyrolysis mass spectra containing 0, 25, 50, 75, and 100 μg lysozyme in 20 μg glycogen, (2) for the calculation of the ampicillin titre in E. coli, these may be the replicate normalised pyrolysis mass spectra containing 0, 1250, 2500, 3750, and 5000 μg.ml$^{-1}$ E. coli, (3) for the quantification of S. aureus mixed with E. coli, these may be the replicate normalised pyrolysis mass spectra containing 0, 25, 50, 75, and 100% S. aureus. Finally (4) for the identification of P. acnes, these may be the mass spectra from two isolates from each of the three people.

In this example, the input to the neural network is the normalised pyrolysis mass spectra from the calibration samples collected at Time 2 and the output layer is the mass spectra of the same calibration material analysed at Time 1. A neural network with or without a hidden layer may be used. Both types of neural network employ the back-propagation algorithm; the input and output layers are scaled to lie between 0 and +1 across the 51–200 mass range, and trained until an average RMS error of, for example, 0.5% is reached. Given the large number of connection weights to be updated, this process is relatively quick and typically takes between $2.10^3$–$1.10^4$ epochs.

To compare the performance of a neural network based drift correction with corrections based on linear corrections alone, two methods relying on mass-by-mass transformations are included in this example. Linear subtractions are used where the amount of drift in each mass is calculated by first subtracting the normalised mass spectrum collected at Time 1 (old) from the mass spectrum collected at Time 2 (new): this is done for the calibration samples and the average drift in each mass computed. These drift correction values are then subtracted from each of the masses in newly acquired (Time 2) mass spectra:

Linear method 1 = (new mass) - (average of (new calibration mass - old calibration mass))

The second linear transformation involves calculating the average mass-by-mass ratio between the mass spectra of the calibration samples collected at Time 1 (old) and Time 2 (new). These ratios can then be used to scale each of the masses in newly acquired mass spectra collected at Time 2.

Linear method 2 = (new mass) * (average ratio of old calibration mass:new calibration mass)

The results of this comparison can be seen in Table 3 below.

The results of performing the method as described above will now be explained.

EXAMPLE 1

The Quantification of Lysozyme in Glycogen

Figure 2:
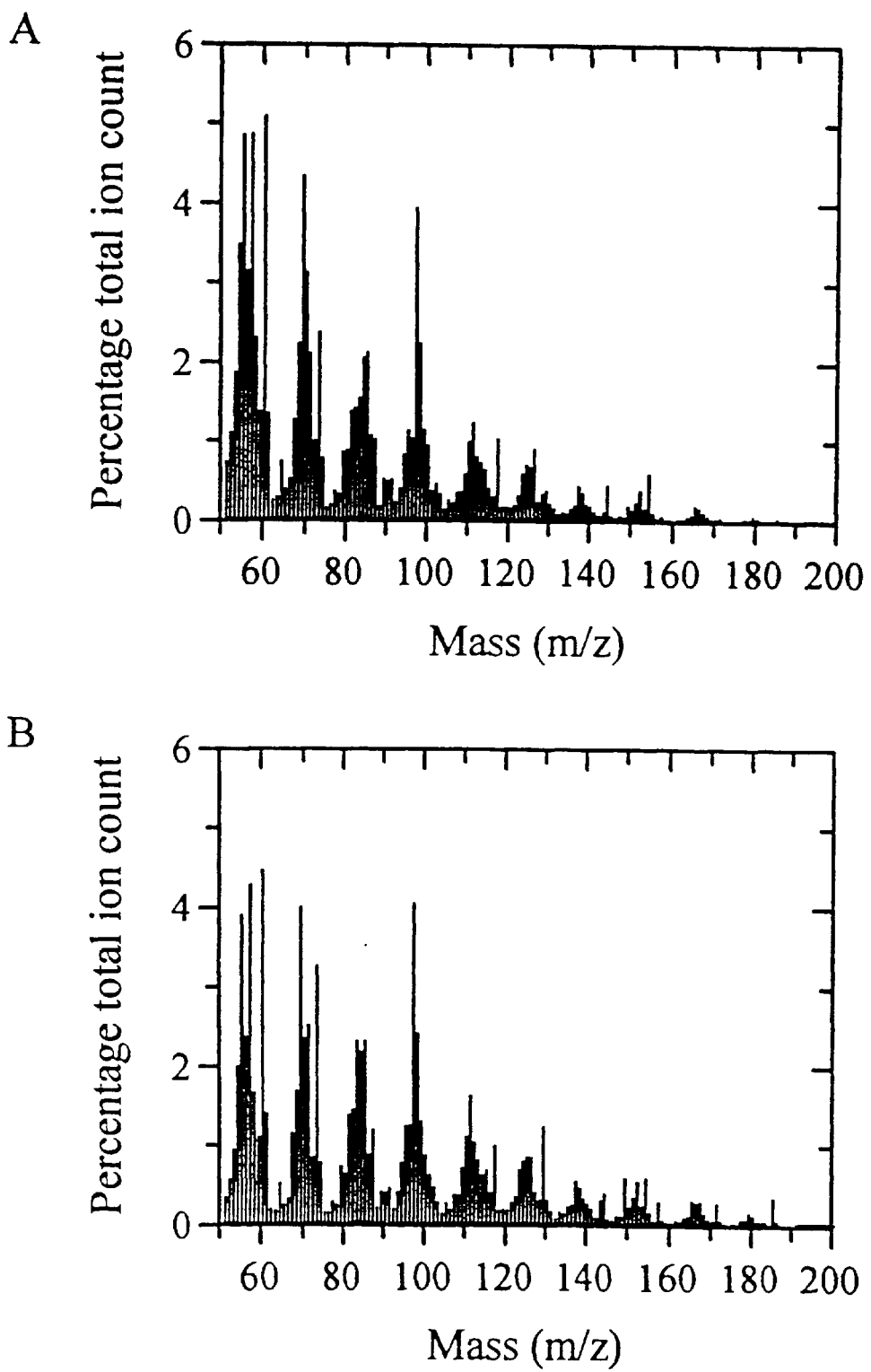
FIG. 2 is a graph of the normalised pyrolysis mass spectra of lysozyme mixed with glycogen.
Figure 3:
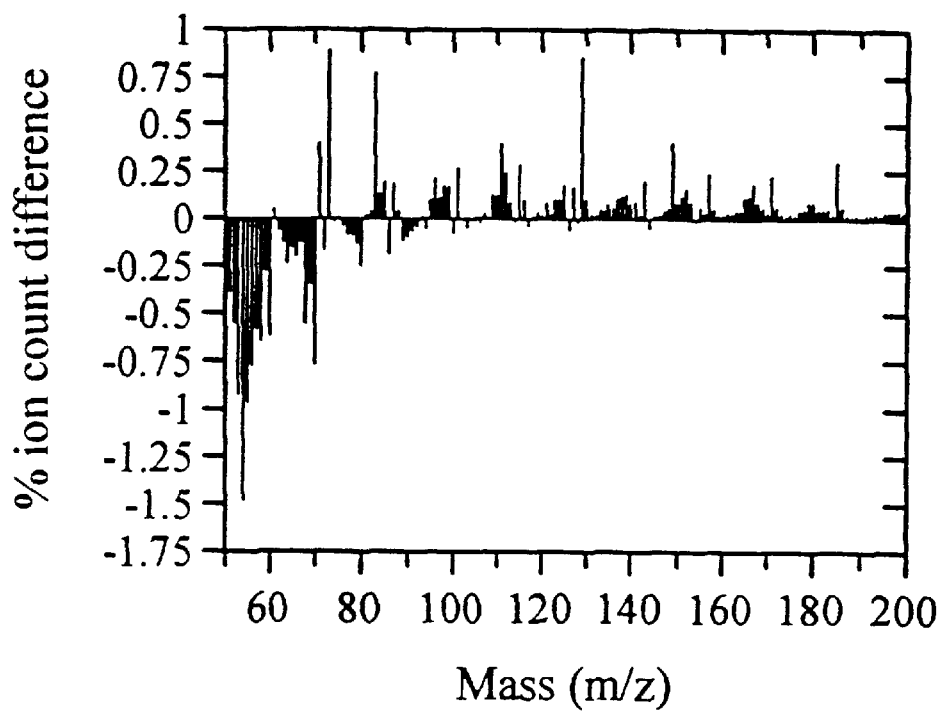
FIG. 3 is a graph of the subtraction spectrum of the normalised average of three pyrolysis mass spectra of FIG. 2.

Normalised pyrolysis mass spectral fingerprints of 50 μg lysozyme mixed with 20 μg glycogen analysed at Time 1 on Aug. 27, 1992 and the same material analysed 600 days later on Apr. 19, 1994 (Time 2) are shown in FIG. 2. These mass spectra are complex as judged by eye and there is little obvious difference between them. One way of highlighting any differences between these spectra is simply to subtract one from the other; the resulting subtraction spectrum of the normalised average of three pyrolysis mass spectra of 50 μg lysozyme mixed with 204 μg glycogen analysed Aug. 27, 1992 (FIG. 2A) subtracted from the equivalent normalised average spectra from the same material analysed on Apr. 19, 1994 (FIG. 2B) is shown in FIG. 3. The positive half of the graph indicates the peaks that are more intense in the pyrolysis mass spectra collected at Time 2, likewise the negative half of the graph indicates masses that are more intense when collected at Time 1. FIG. 3 indeed shows that the intensities of some masses are different. The next stage is therefore to ascertain if these differences due to instrument drift are large enough to be problematic when using neural networks trained with data from Time 1 to give accurate estimates of the amount of lysozyme from pyrolysis mass spectra collected at Time 2.

Data collected from Time 1 from mixing lysozyme in glycogen were split into two sets. The training set contained the normalized triplicate ion intensities from the pyrolysis mass spectra from 0, 10, 20, 30, 40, 50, 60, 70, 80, 90 and 100 μg of lysozyme in 20 μg glycogen, whilst the cross validation set contained both the training set and the 10 "unknown" pyrolysis mass spectra (5, 15, 25, 35, 45, 55, 65, 75, 85 and 95 μg of the determinand lysozyme in 20 μg glycogen). We then trained ANNs, using the standard back-propagation algorithm, with the normalized PyMS data from the training sets as the inputs and the amount of determinand (0–100 μg lysozyme) mixed in 20 μg glycogen as the output. The details of input and output scaling, and the length of training, are given in FIG. 3. Once trained to 0.5% RMS error in the training set, the ANN was then interrogated with the training and cross validation sets and a plot of the network's estimate versus the true amount of lysozyme of 20 μg glycogen (FIG. 4) gave a linear fit which was indistinguishable from the expected proportional fit (i.e. y=x). It was therefore evident that the network's estimate of the quantity of lysozyme in the mixtures was very similar to the true quantity, both for spectra that were used as the training set (open circles) and, most importantly, for the "unknown" pyrolysis mass spectra (open squares).

Figure 4:
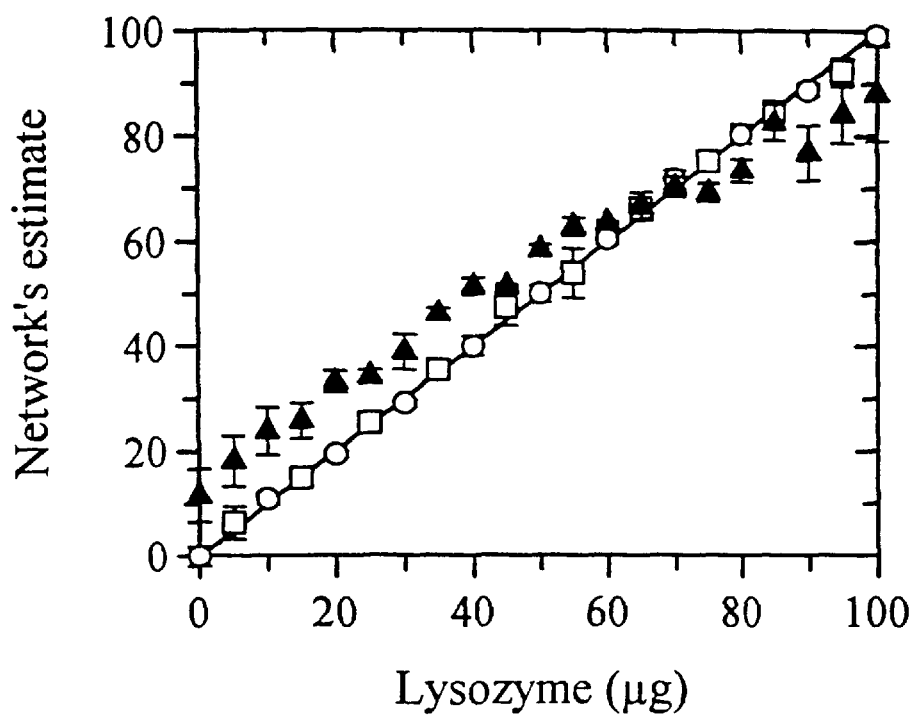
FIG. 4 is a graph of the true amount of lysozyme in the glycogen and the amount estimated using the method of the present invention.

Now that the neural network was optimally trained (i.e. trained to give the best generalisation as judged by the cross validation set), the next stage was to interrogate the network with all the normalised pyrolysis mass spectra of 0–100 μg lysozyme (in steps of 5 μg) in 20 μg glycogen collected at Time 2. The network's estimates for these samples are also shown in FIG. 4 (closed triangles), where it can be seen that the network's estimate versus the true amount of lysozyme in 20 μg glycogen no longer gave a truly linear (or proportional) fit. The percentage error in these estimates (FIG. 4) was 8.68% compared to 0.83% for the same samples analysed at Time 1. Table 3 shows the slope and intercept of the best fit line for the network's estimates versus the true concentrations: it is notable that the slope for data collected at Time 1 was 0.99 but only 0.73 for those collected at Time 2. These results clearly show that the pyrolysis mass spectra of the same material had changed significantly between Aug. 27, 1992 (Time 1) and Apr. 19, 1994 (Time 2), thus resulting in an inability to use neural networks trained with data collected at Time 1 to give accurate predictions for data from the same material subsequently collected at Time 2.

It has been found, however, that it is possible to apply a mathematical correction procedure to compare directly two sets of data of the same material. As described above, calibration spectra (standards) were chosen at the two time periods and these were the triplicate normalised pyrolysis mass spectra containing 0, 25, 50, 75, and 100 μg lysozyme in 20 μg glycogen. These standards were used by each of the four numerical methods also described above; two of these were based on neural networks and two used linear transformations.

Figure 5:
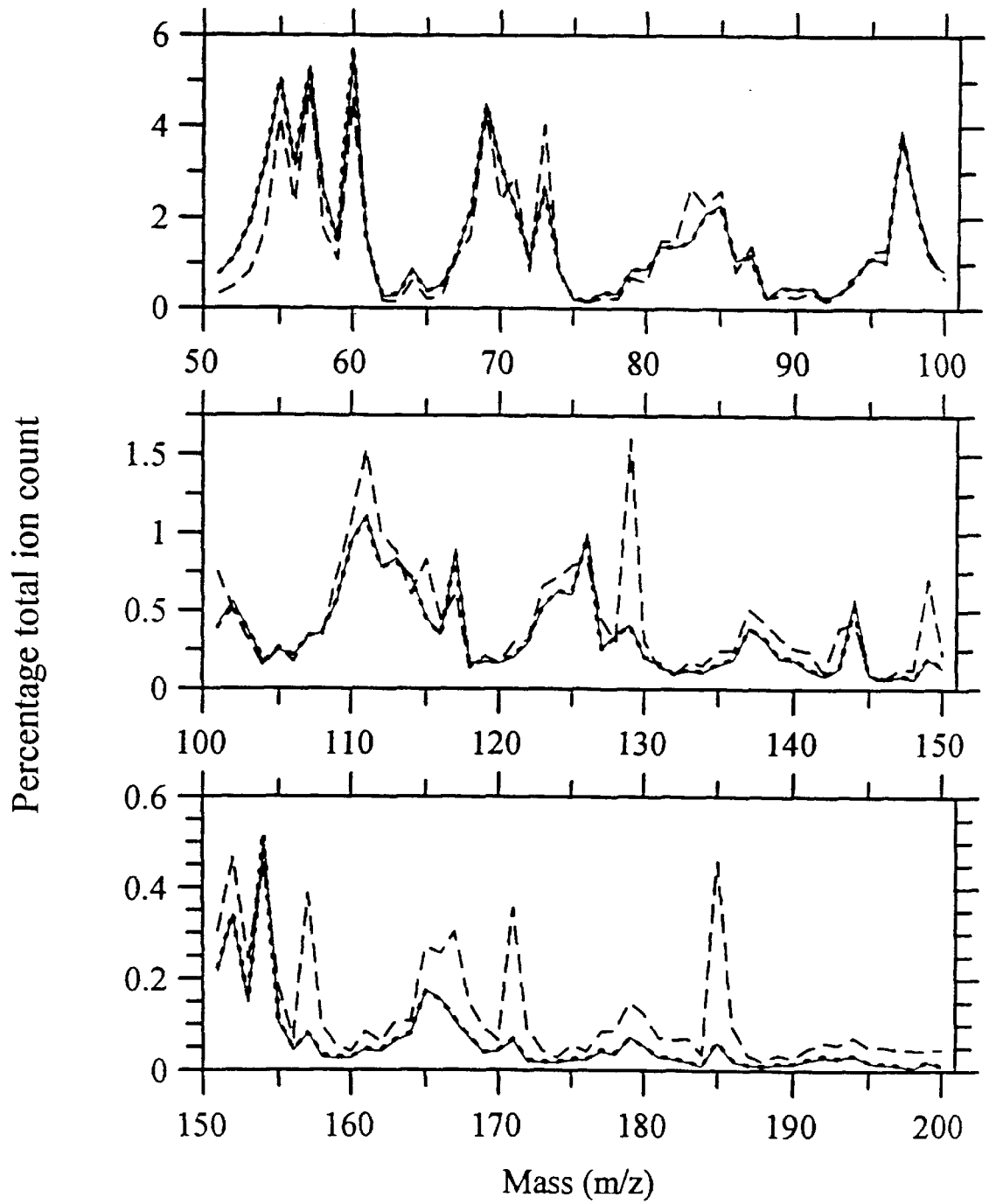
FIG. 5 is a graphical representation of the values shown in FIG. 4.

After training 150-8-150 neural networks to transform new mass spectra collected at Time 2 into those previously collected at Time 1, the first stage was to observe how similar the transformed mass spectra were to the old mass spectra of the same material. FIG. 5 shows that normalized pyrolysis mass spectra of 35 μg lysozyme mixed with 20 μg glycogen (chosen because it had not been used to train the neural network) analysed on Aug. 27, 1992 (Time 1, thin filled line), Apr. 19, 1994 (Time 2, broken line), and the spectra from Time 2 transformed by a 150-8-150 neural network (bold broken line). It is clear that there is, as expected from FIGS. 3 and 4, some difference in the mass spectra collected at the two different times, but that the transformed spectrum shows little or no difference compared to the real mass spectra collected at Time 1; it was therefore evident that this correction procedure had indeed corrected for instrumental drift.

Figure 6:
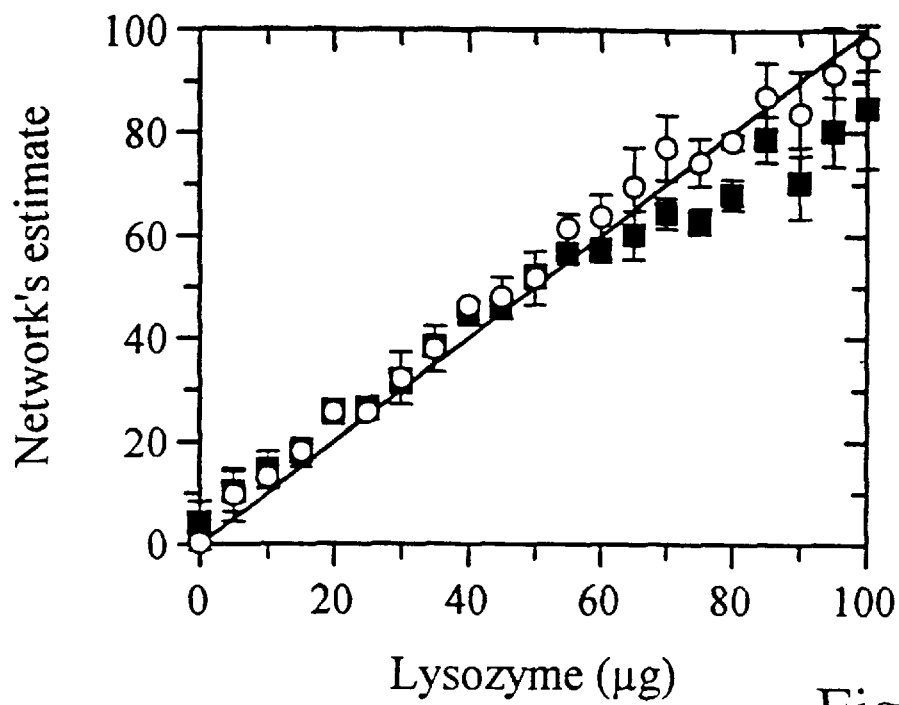
FIG. 6 is a graph of the true amount of lysozyme in the glycogen and the amount estimated using the method of the present invention at a later time than that of FIG. 4.

The next stage was to use these neural network transformed spectra, and those transformed by linear methods, to challenge neural networks trained with PyMS data from Time 1 to quantify the amount of lysozyme in mixtures with 20 μg glycogen. These ANNs employed the standard back propagation algorithm and were trained to 0.5% RMS error as detailed in Table 2 above. FIG. 6 shows the estimates of trained 150-8-1 neural networks vs. the true amount of lysozyme (0–100 μg in 20 μg glycogen) for data collected at Time 2 (Apr. 19, 1994) after correction for instrumental drift by either (a) 150-8-150 ANN drift correction (open circles) or (b) a linear mass-by-mass subtraction correction (closed squares). It can clearly be seen that the neural network transformed mass spectra give better estimates than do the linear transformed spectra; this is particularly notable within the range 50–100 μg lysozyme. The error in the estimates and the slope and intercept of the best fit lines for these and the other two correction methods used are detailed in Table 3. The typical error in the neural network based transformations was 3.49% for the 150-8-150 ANN and slightly lower at 2.77% for the neural network with no hidden layer, compared with 8.68% for no correction applied; for the linear subtraction and linear ratios on the individual m/z intensities, the errors were 10.30% and 6.29% respectively. It is likely that using the ratios to correct was better than using subtractions of drift because the latter will introduce some negative m/z intensities in the transformed spectra; this phenomenon is not possible with real data and is in this instance a consequence of having to normalise to the total ion count.

Figure 7:
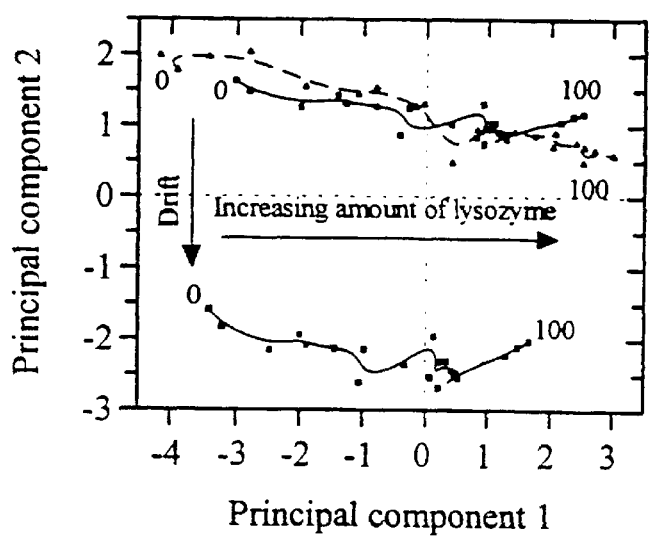
FIG. 7 is a series of principal components analysis plots for lysozyme mixed with glycogen.
Figure 7:
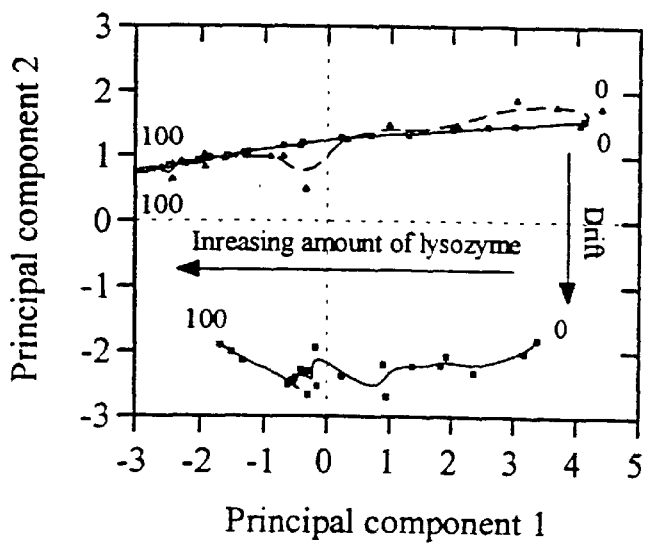

Further to highlight the success of the neural network corrections over the linear ones, the transformed mass spectra were analysed with the data collected at Time 1 and Time 2 by PCA (FIG. 7); the first plot (FIG. 7A) shows the effect on transforming data from Time 2 to Time 1 using the linear subtraction method, whilst the second plot (FIG. 7B) shows the effect of a 150-8-150 ANN transformation. In both plots the first PC describes the features in the mass spectra which account for the increasing amount of lysozyme and the second PC accounts for the effect of instrument drift. It can be seen that both transformations 'move' the Time 2 data closer to Time 1 but that the neural network transformation is more successful because the line from these transformed data (FIG. 7B) more nearly overlaps the line from the data collected at Time 1.

To reiterate, artificial neural networks can be trained with pyrolysis mass spectral data to quantify lysozyme in glycogen; however these neural network models could not be used with mass spectra from identical material collected 600 days later due to the uncertainty of long-term reproduction of the pyrolysis mass spectrometry system. In accordance with the present invention, 150-8-150 and 150—150 neural networks can be used to correct successfully for the drift observed in these pyrolysis mass spectra so that neural network models created using old data (Time 1) can be used with newly acquired spectra from Time 2. We consider that this success was due to the ability of these ANNs to effect non-linear as well as linear transformations, since linear transformation methods alone could not be used adequately to correct for instrument drift.

EXAMPLE 2
The Quantification of Ampicillin in *Escherichia coli*

Data collected from Time 1 from mixing ampicillin with *E. coli* were split into two sets. The training set contained the normalized triplicate ion intensities from the pyrolysis mass spectra from 0, 500, 1000, 1500, 2000, 2500, 3000, 3500, 4000, 4500 and 5000 $\mu$g.ml$^{-1}$ of ampicillin mixed with 40 $\mu$g.ml$^{-1}$ *E. coli*, whilst the cross validation set contained both the training set and the 10 "unknown" pyrolysis mass spectra (250, 750, 1250, 1750, 2250, 2750, 3250, 3750, 4250 and 4750 $\mu$g.ml$^{-1}$ of the determinand ampicillin in 40 $\mu$g.ml$^{-1}$ *E. coli*). ANNs were then trained using the standard back-progapation algorithm, with the normalized PyMS data from the training sets as the inputs and the amount of determinand (0–5000 $\mu$g.ml$^{-1}$ ampicillin) mixed in 40 $\mu$g.ml$^{-1}$ *E. coli* as the output. The details of input and output scaling, and the length of training, are given in Table 2. Once trained to 1.0% RMS error in the training set, the ANN was then interrogated with the training and cross validation sets and a plot of the network's estimate versus the true concentration of ampicillin in *E. coli* (FIG. 11) gave a linear fit which was 30 indistinguishable from the expected proportional fit. It was therefore evident that the network's estimate of the ampicillin titre in the mixtures was very similar to the true quantity, both for spectra that were used as the training set (open circles) and, most importantly, for the "unknown" pyrolysis mass spectra (open squares).

Figure 8:
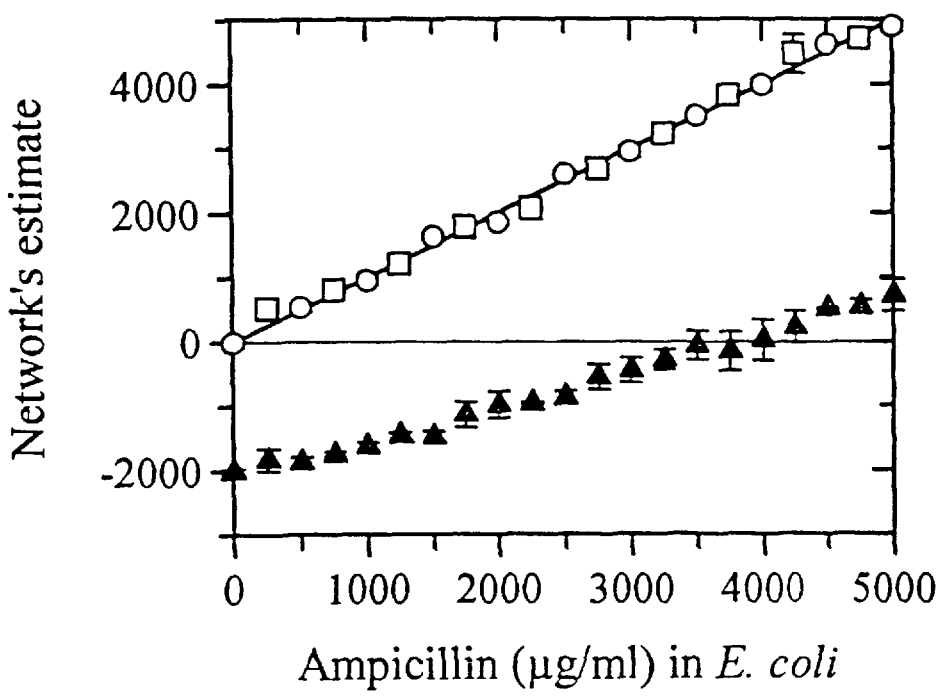
FIG. 8 is a graph of the true amount of ampicillin titre and the amounts estimated using the method of the present invention.

Now that the neural network was optimally trained, the next stage was to interrogate the network with all the normalised pyrolysis mass spectra of 0–5000 $\mu$g.ml$^{-1}$ ampicillin (in steps of 250 $\mu$g.ml$^{-1}$) in 40 $\mu$g.ml$^{-1}$ *E. coli* collected at Time 2. The network's estimate for these samples are also shown in FIG. 8 (closed triangles), where it can be seen in this plot that the network's estimate versus the true ampicillin titre was very inaccurate. The percentage error in these estimates (Table 3) was 64.76% compared to 1.70% for the same samples analysed at Time 1. These results show unequivocally that the pyrolysis mass spectra of the same material had changed significantly between Jul. 22, 1993 (Time 1) and Apr. 19, 1994 (Time 2), thus resulting in an ability to use neural networks trained with data collected at Time 1 to give predictions for data from the same material subsequently collected at Time 2.

It was found that it is however possible to apply a mathematical correction procedure to compare directly these two sets of data. As described above, calibration spectra (standards) were chosen at the two time periods and these were the triplicate normalised pyrolysis mass spectra containing 0, 1250, 2500, 3750, and 5000 $\mu$g.ml$^{-1}$ ampicillin in 40 $\mu$g.ml-1 *E. coli*. These standards were used by each of the four numerical methods described above and used to transform the mass spectra collected at Time 2.

Figure 9:
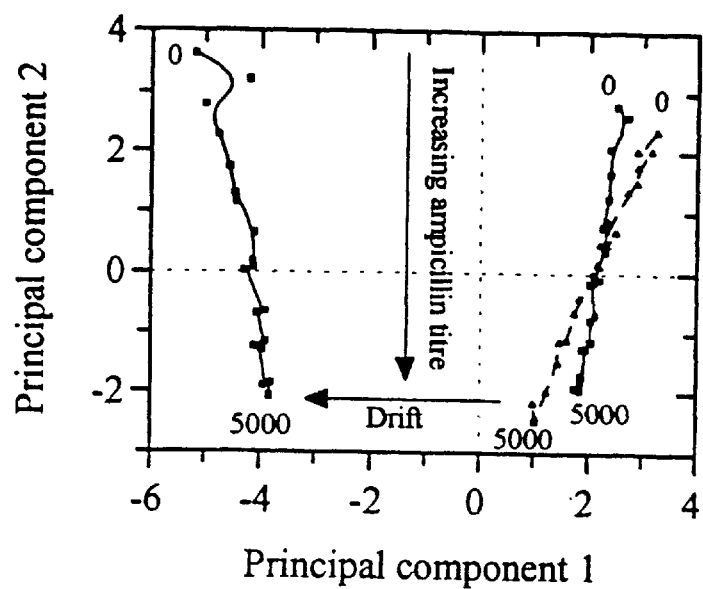
FIG. 9 is a series of principal components analysis plots for ampicillin mixed with E. coli.
Figure 9:
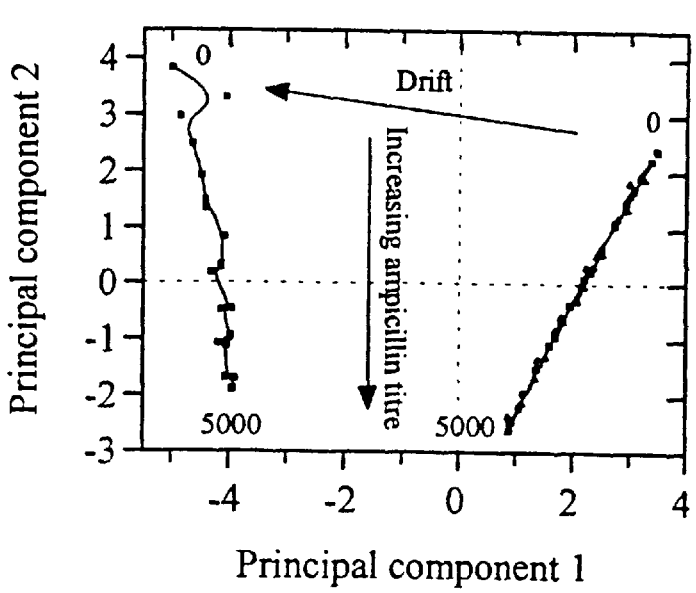

The first stage was to observe the relationships between the transformed data using neural networks without a hidden layer in this example (150—150 architecture) and the linear mass-by-mass ratio transformed data with data collected on Jul. 22, 1993 (Time 1) and Apr. 19, 1994 (Time 2) using PCA, FIG. 9. FIG. 9A shows the effect on transforming data from Time 2 to Time 1 using the linear ratio method and FIG. 9B shows the effect of a 150—150 ANN transformation. In both plots the first PC accounts for the effect of instrument drift and the second PC describes the features in the mass spectra which account for the increasing ampicillin titre. As seen previously, both transformations 'move' the Time 2 data closer to Time 1 but the neural network transformation is more successful because the line from these transformed data (FIG. 9B) more nearly overlaps the line from the data collected at Time 1. It is particularly noteworthy that the linear transformed estimates are parallel with the Time 2 untransformed data (FIG. 9A), whereas a 150—150 transformation produces data which map accurately onto the data from Time 1 (FIG. 9B); this may again be explained by the ability of the ratio transformation to correct the mass spectra only in a linear manner.

Figure 10:
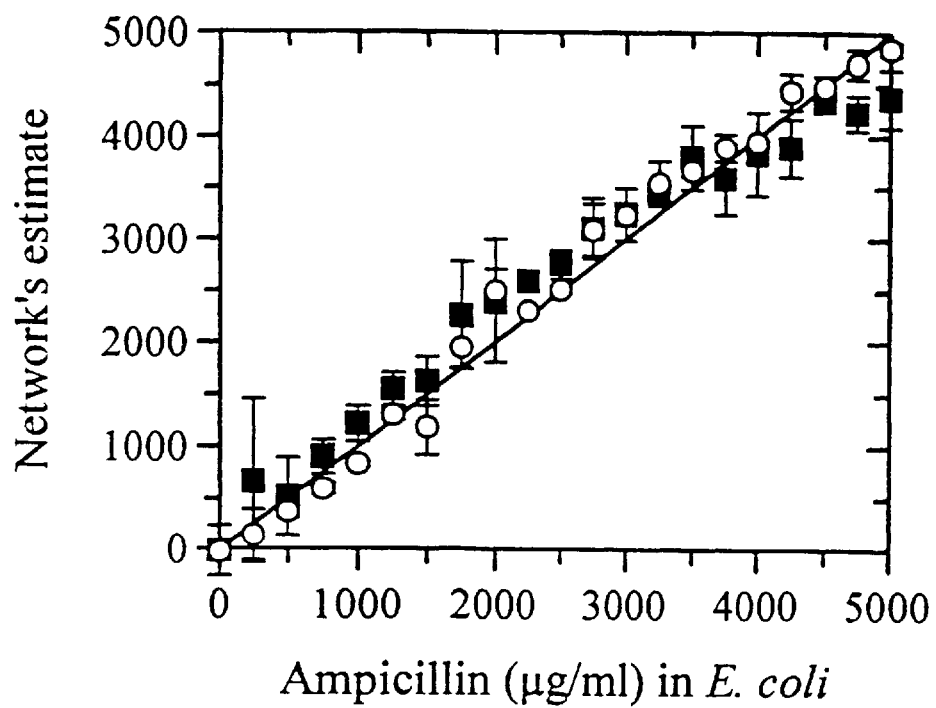
FIG. 10 is a graph of the true amount of ampicillin titre and the amount estimated using the method of the present invention.

The next stage was to use these 150—150 neural network transformed spectra, and those transformed by the linear ratio method, to challenge neural networks trained with PyMS data from Time 1 to assess the ampicillin titre when mixed with 40 $\mu$g.ml$^{-1}$ *E. coli*. These ANNs employed the standard back propagation algorithm and were trained to 1.0% RMS error as detailed in Table 2. FIG. 10 shows the estimates of trained 150-8-1 neural networks vs. the true ampicillin concentration (0–5000 $\mu$g.ml$^{-1}$) for data collected at Time 2 (Apr. 19, 1994) after correction for instrumental drift by either (a) 150—150 ANN drift correction (open circles) or (b) a linear mass-by-mass ratio correction (closed squares). It can be observed that the neural network transformed mass spectra give better estimates than do the linear transformed spectra. The error in the estimates and the slope and intercept of the best fit lines for these and the other two correction methods used are detailed in Table 3. The typical error in the neural network based transformations was 3.19% for the 150—150 ANN and 3.69% for the neural network with 8 nodes in the hidden layer, compared with 64.76% when no correction was applied. Again ANNs with no hidden layer gave slightly better estimates than did those containing a hidden layer. For the linear subtraction and linear ratios on the individual m/z intensities, the errors were 7.33% and 5.50% respectively. In this example the linear methods appear to have performed rather well; however the slope of the best fit lines of the estimates versus the known ampicillin titre (Table 3) were 1.13 and 0.87 for the linear subtraction and ratio correction methods compared to 1.00 and 1.03 for the 150-8-150 and 150—150 ANN corrections respectively.

In conclusion, neural networks can be trained with pyrolysis mass spectral data to quantify ampicillin in *E. coli*, as a model of a fermentation. These same neural network models could not however, be used with mass spectra from identical material collected 271 days later. In accordance with the present invention, 150-8-150 and 150—150 neural networks can be used to correct successfully for the drift observed in these pyrolysis mass spectra so that neural network models created using old data from Time 1 can be used with newly acquired spectra from Time 2.

EXAMPLE 3
The Quantification of *Staphylococcus aureus* in *Escherichia coli*

Data collected from Time 1 from mixing *S. aureus* with *E. coli* were split into two sets. The training set contained the normalized triplicate ion intensities from the pyrolysis mass spectra from 0, 25, 50, 75 and 100% *S. aureus* mixed with *E. coli*, whilst the cross validation set contained both the training set and the 8 "unknown" pyrolysis mass spectra (10, 20, 30, 40, 60, 70, 80 and 90%). ANNs were then trained, using the standard back-propagation algorithm, with the normalized PyMS data from the training sets as the inputs and the percentage *S. aureus* mixed with *E. coli* as the output. The details of input and output scaling, and the length of training, are given in Table 2. This 150-8-1 neural network was optimally trained (i.e. trained to give the best generalisation as judged by the cross validation set) to 0.3% RMS error in the training set. The ANN was then interrogated with the training and cross validation sets from Time 1, the new pyrolysis mass spectra from Time 2 and these data after instrument drift correction by each of the four transformation methods.

The percentage error in these estimates, and the slope and intercepts of the best fit lines of the estimates versus % *S. aureus*, are given in Table 3. It can be seen that on-the-day error (as judged by the estimates from Time 1) was only 1.24% and when interrogated with spectra collected 535 days later was 16.83%. The error in the estimates after correction using 150-8-150 and 150—150 ANNs were 3.41% and 5.06%, so in this example the neural network containing a hidden layer was better for correcting for instrumental drift; for the linear subtraction and linear ratio transformation methods, the % errors although similar were less good and calculated to be 7.47 and 7.67.

In conclusion, neural networks can be trained with pyrolysis mass spectral data to quantify a mixed population of *S. aureus* and *E. coli*. However, these neural network models could not be used to give accurate % *S. aureus* estimates for mass spectra from identical material collected 535 days later. In accordance with the present invention, 150-8-150 and 150—150 neural networks can be used to correct successfully for instrumental drift so that neural network models created using old data from Time 1 can be used to give accurate *S. aureus* measures from newly acquired spectra.

EXAMPLE 4
The Identification of *Propionibacterium acnes*

Data collected at Time 1 from the 19 strains of *P. acnes* were split into two sets. The training set contained the normalized triplicate ion intensities from the pyrolysis mass spectra from two isolates from each of the people, details being given in Table 4 below, and the three outputs were binary encoded as explained above. The interrogation set contained the triplicates of all 19 pyrolysis mass spectra. ANNs were then trained, using the standard back-propagation algorithm, with the normalized PyMS data from the training sets as the inputs and the bacterial identity as the output. The details of input and output scaling are given above. Training was stopped when the % RMS error in the training set was 1% and this took approximately $2.10^3$ epochs. After training, the interrogation set from Time 1 was applied to the input nodes of the neural network and the answers are given in FIG. 14, where it can be seen that each of the 19 bacteria were identified correctly.

Now that the neural network was trained to give correct results for 'unknown' pyrolysis mass spectra, the next stage was to interrogate with all the normalised pyrolysis mass spectra from the same bacteria collected 125 days later Time 2. The network's identities for these samples are also shown in Table 4, where it can be seen that 6 of the 19 bacteria were incorrectly identified. These results unequivocally show that the pyrolysis mass spectra of the same material had changed significantly between Jan. 28, 1994 (Time 1) and Jun. 2, 1994 (Time 2), thus resulting in an inability to use neural networks trained with data collected at Time 1, to identify these *P. acnes* strains, to give accurate identities for data from the same bacteria subsequently collected at Time 2.

We have found that it is however possible to apply a mathematical correction procedure to compare directly these two sets of data. Calibration spectra were chosen at the two time periods and these were the triplicate normalised pyrolysis mass spectra from two isolates from each of the three people; details are given in Table 4. These standards were used by each of the four numerical methods described above and used to transform the mass spectra collected at Time 2.

Figure 11:
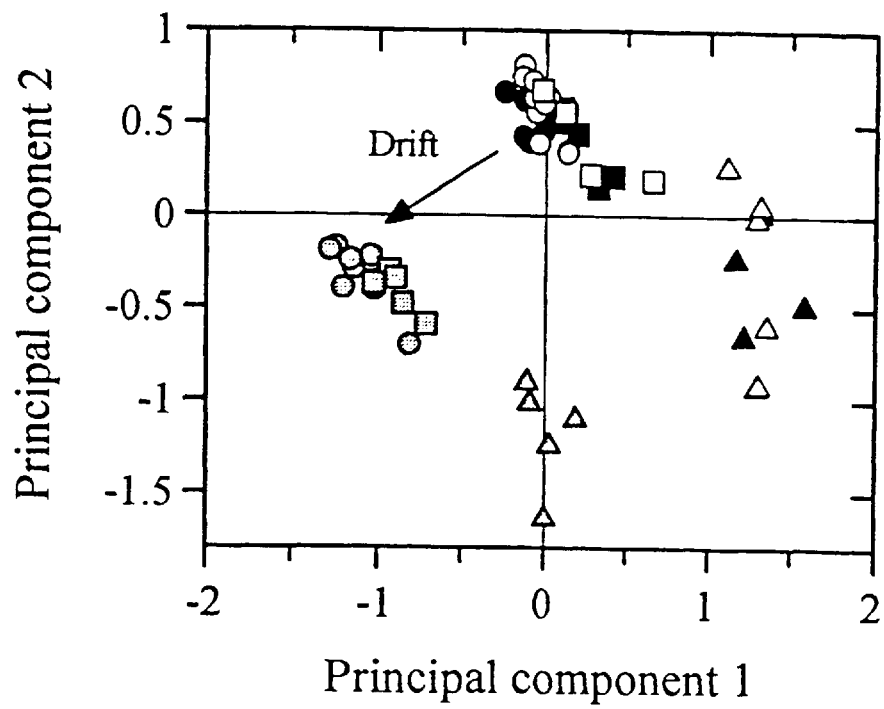
FIG. 11 is a principal components analysis plot of P. acnes human isolates.

The first stage was to carry out PCA to observe the natural relationships between the transformed data using 150-8-150 neural networks with data collected at Time 1 and Time 2; the PCA plot is shown in FIG. 11 where it can be observed that a combination of the first two PCs clearly reflects the effect of instrument drift (indicated by the arrow). In this PCA plot it can be seen that the isolates from person c form a distinct cluster (triangles) and that although the isolates from people a (circles) and person b (squares) cluster tightly together they can be separated. This may help to explain why the neural network trained with data from Time 1 when interrogated with new pyrolysis mass spectra mis-identified 4 of the 5 isolates from person b as being from person a. The most important observation from this PCA plot is that the 150-8-150 ANN transformed mass spectra (open symbols) overlap with the data collected at Time 1 (closed symbols) and no longer cluster with the data from Time 2 (partially shaded symbols). Moreover, the strains from each of the three people can be seen to cluster together.

The next stage was to use these neural network transformed spectra, and those transformed by the linear ratio method, to challenge the 150-8-3 neural networks trained with PyMS data from Time 1 to identify the three *P. acnes* strains. The results after interrogation are shown in FIG. 14 where instead of mis-identifying 6 of the 19 bacteria (31.6% of total) only 1 isolate (5.3% of total) from person b was mis-identified the same bacterium was identified incorrectly by both of these methods. When the other two correction techniques (150—150 ANNs and linear subtraction method) were used to transform the pyrolysis mass spectra and used to challenge the 150-8-3 neural network, the same results were seen; 18 of the 19 bacteria were identified correctly as opposed to only 13 and the same strain from person b was mis-classified.

To reiterate, neural networks can be trained with pyrolysis mass spectral data to identify *P. acnes* isolated from the foreheads of three individuals. However, these neural network models could not be used to give accurate classifications for mass spectra from the same bacteria collected 125 days later. Thus, in accordance with the present invention, 150-8-150 and 150—150 neural networks and the two linear models were used successfully to correct for instrumental drift so that neural network models created using old data from Time 1 could be used to give accurate isolate identities from newly acquired spectra.

In conclusion, in accordance with the present invention, neural networks can be used successfully to correct for instrumental drift so that neural network models created using data collected previously can be used to give accurate estimates of determinand concentration or bacterial identities (or indeed other materials) from newly acquired spectra, even though the drift in the mass spectrometer is substantial such that the use of untransformed data leads to inaccurate analyses. Whilst the present examples have used pyrolysis mass spectrometry, it should seem obvious that this approach is not limited solely to pyrolysis mass spectrometry but is generally applicable to any analytical tool which is prone to instrumental drift (and which cannot be compensated for by tuning), such as infra red spectroscopy, nuclear magnetic resonance and chromatographic methods, as well as mass spectrometry generally. It will also be appreciated that while the present invention has been described with reference to very specific examples of substances and structures of neural networks, the scope of the invention is not limited to these.

TABLE 1

| PyMS experiment | Pyrolysis mass spectra collected | | Time difference | |
|---|---|---|---|---|
| designed to | Time 1 | Time 2 | days | months |
| quantify lysozyme in glycogen | 27 August, 1992 | 19 April, 1994 | 600 | 19.7 |
| quantify of S. Aureus in E. coli | 30 September, 1992 | 18 April, 1994 | 535 | 17.6 |
| quantify ampicillin in E. coli | 22 July, 1993 | 19 April, 1994 | 271 | 8.9 |
| identify P. acnes human isolates | 28 January, 1994 | 2 June, 1994 | 125 | 4.1 |

TABLE 2

| | Lysozyme ($\mu$g) in 20 $\mu$g glycogen* | Ampicillin titre ($\mu$g. ml$^{-1}$ in 40 mg.ml$^{-1}$ E. coli* | % S. aureus in E. coli* |
|---|---|---|---|
| Training data | 0,10,20,30,40,50, 60,70,80,90,100 | 0.500,1000,1500,2000,2500, 3000,3500,4000,4500,5000 | 0.25,50,75, 100 |
| Cross validation data | 5,15,25,35,45,55, 65,75,85,95 | 250,750,1250,1750,2250 2750,3250,3750,4250,4750 | 10,20,30,40, 60,70,80,90 |
| Scaling on | | | |
| Input layer# | 0 to 5000 | 0 to 5000 | 0 to 6000 |
| Output layer | −50 to 150 | −2500 to 7500 | −10 to 110 |
| % RMS error | | | |
| Training set | 0.5 | 1.0 | 0.3 |
| Cross validation set | 1.36 | 1.14 | 1.55 |
| Number of epochs | 1.10$^4$ | 2.10$^3$ | 5.10$^3$ |

*The best generalisation point was established using cross validation
Input layer was scaled across the whole mass range.

TABLE 3

| | Time 1 | Time 2 | ANN correction | | Linear transformation | |
|---|---|---|---|---|---|---|
| | | | 150-8-150 | 150-150 | method 1 | method 2 |
| Quantification of lysozyme in glycogen: | | | | | | |
| % Error | 0.83 | 8.68 | 3.49 | 2.77 | 10.30 | 6.29 |
| Slope | 0.99 | 0.73 | 0.94 | 0.93 | 0.62 | 0.77 |
| Intercept | 0.67 | 17.21 | 4.88 | 4.18 | 14.44 | 8.72 |
| Correlation coefficient | 1.00 | 0.99 | 0.99 | 1.00 | 0.99 | 0.99 |
| Quantification of ampicillin in E. coli: | | | | | | |
| % Error | 1.70 | 64.76 | 3.69 | 3.19 | 7.33 | 5.50 |
| Slope | 0.99 | 0.56 | 1.00 | 1.03 | 1.13 | 0.87 |
| Intercept | 35.30 | −2142.40 | 69.40 | −31.08 | −127.00 | 400.84 |
| Correlation coefficient | 1.00 | 0.99 | 0.99 | 0.99 | 0.98 | 0.98 |
| Quantification of S. aureus in E. coli: | | | | | | |
| % Error | 1.24 | 16.83 | 3.41 | 5.06 | 7.47 | 7.67 |
| Slope | 1.03 | 0.87 | 1.01 | 1.05 | 1.09 | 0.99 |
| Intercept | −1.43 | 23.06 | 1.38 | −2.97 | −3.39 | 5.54 |
| Correlation coefficient | 1.00 | 0.95 | 0.99 | 0.99 | 0.98 | 0.97 |

TABLE 4

| Identity | Results from PyMS data from Time 1 | | | Results from PyMS data from Time 2 | | | Results after correcting for drift using a 150-8-150 ANN | | | Results after correcting for drift using a linear mass-by-mass ratio ratio transformation | | |
|---|---|---|---|---|---|---|---|---|---|---|---|---|
| | a | b | c | a | b | c | a | b | c | a | b | c |
| a* | 1.0 | 0.0 | 0.0 | 1.0 | 0.0 | 0.0 | 1.0 | 0.0 | 0.0 | 1.0 | 0.0 | 0.0 |
| a | 1.0 | 0.0 | 0.0 | 1.0 | 0.0 | 0.0 | 0.7 | 0.3 | 0.0 | 1.0 | 0.0 | 0.0 |
| a | 1.0 | 0.0 | 0.0 | 1.0 | 0.0 | 0.0 | 0.7 | 0.3 | 0.0 | 1.0 | 0.0 | 0.0 |
| a | 1.0 | 0.0 | 0.0 | 1.0 | 0.0 | 0.0 | 1.0 | 0.0 | 0.0 | 1.0 | 0.0 | 0.0 |
| a | 1.0 | 0.0 | 0.0 | 1.0 | 0.0 | 0.0 | 1.0 | 0.0 | 0.0 | 1.0 | 0.0 | 0.0 |
| a | 1.0 | 0.0 | 0.0 | 1.0 | 0.0 | 0.0 | 0.7 | 0.3 | 0.0 | 1.0 | 0.0 | 0.0 |
| a* | 1.0 | 0.0 | 0.0 | 1.0 | 0.0 | 0.0 | 1.0 | 0.0 | 0.0 | 0.8 | 0.0 | 0.0 |
| a | 1.0 | 0.0 | 0.0 | 1.0 | 0.0 | 0.0 | 0.7 | 0.3 | 0.0 | 1.0 | 0.0 | 0.0 |
| a | 1.0 | 0.0 | 0.0 | 1.0 | 0.0 | 0.0 | 0.8 | 0.1 | 0.0 | 0.0 | 0.0 | 0.0 |
| b* | 0.0 | 1.0 | 0.0 | 0.8 | 0.7 | 0.0 | 0.0 | 1.0 | 0.0 | 0.0 | 0.9 | 0.0 |
| b | 0.1 | 1.0 | 0.0 | 1.0 | 0.5 | 0.0 | 0.0 | 1.0 | 0.0 | 0.2 | 0.8 | 0.0 |
| b* | 0.0 | 1.0 | 0.0 | 1.0 | 0.4 | 0.0 | 0.0 | 1.0 | 0.0 | 0.3 | 0.8 | 0.0 |
| b | 0.0 | 1.0 | 0.0 | 0.3 | 0.8 | 0.0 | 0.0 | 0.7 | 0.3 | 0.0 | 0.9 | 0.0 |
| b | 0.2 | 0.9 | 0.0 | 1.0 | 0.2 | 0.0 | 0.7 | 0.4 | 0.0 | 0.6 | 0.5 | 0.0 |
| c* | 0.0 | 0.0 | 1.0 | 0.0 | 0.9 | 0.3 | 0.0 | 0.0 | 1.0 | 0.0 | 0.0 | 1.0 |
| c | 0.0 | 0.0 | 1.0 | 0.0 | 0.9 | 0.3 | 0.0 | 0.0 | 1.0 | 0.0 | 0.0 | 1.0 |
| c* | 0.0 | 0.0 | 1.0 | 0.0 | 0.1 | 1.0 | 0.0 | 0.0 | 1.0 | 0.0 | 0.0 | 1.0 |
| c | 0.0 | 0.0 | 1.0 | 0.0 | 0.0 | 1.0 | 0.0 | 0.0 | 1.0 | 0.0 | 0.0 | 1.0 |
| c | 0.0 | 0.0 | 1.0 | 0.0 | 0.3 | 0.9 | 0.1 | 0.0 | 0.7 | 0.0 | 0.0 | 1.0 |
| mis-identified | 0/19 or 0% | | | 6/19 or 31.6% | | | 1/19 or 5.3% | | | 1/19 or 5.3% | | |

*Results from the pyrolysis mass spectra from the Time 1 training set. These spectra were also chosen as the calibration samples for drift collection.
Values in bold are those P. acnes isolates which were mis-identified.

We claim:

1. A method of analysing a sample, comprising the steps of training a neural network to correct for measurement drift of a given analytical instrument, said training being carried out using a first set of data obtained by said instrument from samples of known compositions at an initial instant of time and a second set of data obtained by said instrument from samples of the same known compositions at a subsequent instant of time, then using said neural network to transform data, obtained by said instrument from a sample of unknown composition at said subsequent instant of time, to an estimate of the data which would have been obtained by said instrument from said sample of unknown composition at said initial instant of time, and analysing the transformed data to analyse said sample of unknown composition.

2. A method as claimed in claim 1, wherein said transformed data is analysed by a neural network.

3. A method as claimed in claim 2, wherein said analysing neural network is pre-trained using a plurality of exemplars, each exemplar comprising a first set of data obtained by said instrument from a sample of known composition at said initial instant of time and a second set of data representing the composition of that sample, as network input and output respectively.

4. A method as claimed in claim 3, wherein a first number of said plurality of exemplars is used to update said analysing neural network during training whilst a second number of said plurality of exemplars is used to evaluate the resulting change in network performance.

5. A method as claimed in any of claim 2, wherein said analysing neural network comprises a non-linear, multi-layer, feed-forward neural network having at least an input layer and an output layer.

6. A method as claimed in claim 2, wherein said analysing neural network is trained using a gradient descent training algorithm.

7. A method as claimed in claim 1, wherein said transformation neural network is trained using a plurality of exemplars, each exemplar comprising a first set of data obtained by said instrument from a sample of known composition at said initial instant of time and a second set of data obtained by said instrument from a sample of the same known composition at said subsequent instant of time, as network output and input respectively.

8. A method as claimed in claim 7, wherein a first number of said plurality of exemplars is used to update said transformation neural network during training whilst a second number of said plurality of exemplars is used to evaluate the resulting change in network performance.

9. A method as claimed in claim 1, wherein said transformation neural network comprises a non-linear, multi-layer, feed-forward neural network having at least an input layer and an output layer.

10. A method as claimed in claim 1, wherein said transformation neural network is trained using a gradient descent training algorithm.

11. A method as claimed in claim 1, wherein said data obtained by said instrument comprise the mass spectra of a sample.

12. A method as claimed in claim 11, wherein said mass spectra are obtained by pyrolysis mass spectrometry.

13. A method as claimed in claim 11, wherein said instrument is initially tuned.

14. A method as claimed in claim 1, wherein said data obtained by said instrument is scaled or normalised.

15. A method as claimed in claim 14, wherein the scaling or normalisation is such that the magnitudes of the data lie within the range 0 to 1.

16. An apparatus for analysing a sample, comprising a neural network arranged to be trained to correct for measurement drift of a given analytical instrument, using first and second sets of data obtained by said instrument from samples of known compositions at initial and subsequent time instants respectively, said neural network further being arranged to transform data, obtained by said instrument from a sample of unknown composition at said subsequent instant of time, to an estimate of the data which would have been obtained by said instrument from said sample of unknown composition at said initial instant of time, and means for analysing the transformed data to analyse said sample of unknown composition.

17. An apparatus as claimed in claim 16, in which said neural network comprises a non-linear, multi-layer, feed-forward neural network having at least an input layer and an output layer.

18. An apparatus as claimed in claim 16, in which said means for analysing the transformed data comprises a neural network.

19. An apparatus as claimed in claim 18, in which said analysing neural network comprises a non-linear, multi-layer, feed-forward neural network having at least an input layer and an output layer.

20. An apparatus as claimed in claim 17, in which said means for analysing the transformed data comprises a neural network.

* * * * *